(12) United States Patent
Stallkamp

(10) Patent No.: US 6,522,649 B1
(45) Date of Patent: Feb. 18, 2003

(54) METHOD OF DISTRIBUTING VIDEO REFERENCE SIGNALS AS ISOCHRONOUS NETWORK PACKETS

(75) Inventor: Richard Wissler Stallkamp, Tigard, OR (US)

(73) Assignee: Omneon Video Networks, Sunnyvale, CA (US)

( * ) Notice: Subject to any disclaimer, the term of this patent is extended or adjusted under 35 U.S.C. 154(b) by 0 days.

(21) Appl. No.: 09/544,739

(22) Filed: Apr. 7, 2000

(51) Int. Cl.$^7$ ............................................... H04L 12/28
(52) U.S. Cl. ........................................ 370/389; 370/474
(58) Field of Search .................................. 370/389, 394, 370/252, 473, 476, 505, 503, 509, 512

(56) References Cited

U.S. PATENT DOCUMENTS

| | | | | |
|---|---|---|---|---|
| 6,088,366 A | * | 7/2000 | Sung | 370/394 |
| 6,172,989 B1 | * | 1/2001 | Yanagihara et al. | 370/473 |
| 6,256,390 B1 | * | 7/2001 | Okuyama et al. | 380/201 |
| 6,298,196 B1 | * | 10/2001 | Shima et al. | 380/201 |
| 2002/0089517 A1 | * | 7/2002 | Ludtke et al. | 345/629 |

FOREIGN PATENT DOCUMENTS

EP 873019 A2 10/1998 ............ H04N/7/52

* cited by examiner

Primary Examiner—Steven Nguyen
Assistant Examiner—Phuongchau Ba Nguyen
(74) Attorney, Agent, or Firm—Blakely, Sokoloff, Taylor & Zafman, LLP

(57) ABSTRACT

A method of distributing video reference signals as isochronous data includes distributing a house reference signal among various audio and video devices using isochronous network packets that exclusively contain isochronous header information rather than header information accompanied by audio and/or video data. Because the data associated with a house reference signal typically represents an unused "video black" signal, such data may be discarded without detrimentally affecting to the reference signal. By discarding the unused data associated with the video reference signal, isochronous packet size may be reduced and overall bandwidth consumption

25 Claims, 4 Drawing Sheets

METHOD OF DISTRIBUTING VIDEO REFERENCE SIGNALS AS ISOCHRONOUS NETWORK PACKETS

BACKGROUND OF THE INVENTION

1. Field of the Invention

The present invention relates to the distribution of house reference signals. More specifically, the present invention relates to the use of isochronous network packets to deliver house reference signals.

2. Background Information

As advancements in audio/video technology continue to be made, conventional analog audio/video technology is increasingly being replaced by newer digital audio and video systems and data transport mechanisms. Moreover, distribution of audio and video data over digital networks is rapidly becoming commonplace. Unfortunately, however, unlike their plain text counterpart, audio and video (i.e. multimedia) data tends to be resource intensive requiring large amounts of bandwidth when transmitted across networks. Furthermore, due to its dynamic nature, multimedia data does not easily lend itself for use within common asynchronous data transmission networks, whereby data transmission is guaranteed but the amount of time it takes to transfer the data is not. In contrast, isochronous networks, utilize time-stamping techniques and the concept of data transfer cycles to enable near real time transmission of time-dependent data. Although isochronous networks do not guarantee that a given packet will be delivered, on average the multimedia data delivery time will appear more constant as compared to an asynchronous network.

In conventional isochronous data networks, large amounts of digital data are "packetized" into many smaller data segments. Each data segment is stamped with appropriate timing information, such as for example, that provided by a house reference signal, before the data segments or packets are transmitted. Once the data packet is modified to include the timing information, the time-stamped data packet is attached to a packet delivery header which includes delivery information identifying the source and appropriate destination nodes on the network. Once received by a destination node, the data packets are reassembled and processed according to the designated function of the destination node.

Additional information regarding the operation and configuration of isochronous data networks may be found within the IEEE 1394 Standard. The IEEE Standard for a High Performance Serial Bus, IEEE Std. 1394-1995 published Aug. 30, 1996 (1394-1995 Standard) and its progeny provide a high speed serial protocol which permits implementation of high speed data transfers of both asynchronous and isochronous data. The existing progeny includes P1394a Draft Standard for a High Performance Serial Bus (1394a Standard) and P1394b Draft Standard for a High Performance Serial Bus (1394b Standard). Generically, networks implementing 1394-1995, 1394a, 1394b or subsequent revisions and modifications thereof are referred to herein as IEEE 1394 networks. Similarly, additional information regarding a general isochronous packet format may be found in the International Electrotechnical Commission standard 61883-1:1998–02 (hereinafter "IEC 61883").

Most professional audio and video applications are typically equipped to process and manipulate input signals from various audio and video sources. In an audio and/or video editing application, for example, multiple independent audio and video input signals may be received from a variety of sources and subsequently mixed together to form a single coherent audio/video production. In order to properly mix the audio/video input signals from such sources, however, the operation of the sources, as well as other non-source devices within the audio/video system, must be synchronized with respect to time. One way this may be achieved is by locking the operation of the audio/video devices to a common house reference signal. By each device independently referencing a common distributed timing signal, all of the devices should operate in synchronization. House reference signals are typically clock signals that are distributed to the various audio and video devices throughout a studio or plant via one or more dedicated coaxial cables. One problem with such a house reference distribution model, however, is the reliance on outmoded cabling which merely serves the single purpose of distributing the house reference signal.

SUMMARY OF THE INVENTION

A method of distributing video reference signals is described. In one embodiment a source reference signal including source data is received by a first device. An isochronous network packet is in turn generated by the first device based at least in part on the source reference signal and to the exclusion of the source data. Once generated, the isochronous network packet is transmitted by the first device to a secondary device to synchronize timing between the first and secondary devices.

BRIEF DESCRIPTION OF THE DRAWINGS

The invention is illustrated by way of example, and not by way of limitation in the figures of the accompanying drawings in which like reference numerals refer to similar elements.

DETAILED DESCRIPTION

A method of distributing video reference signals as isochronous network packets is disclosed. In the following description, for purposes of explanation, numerous specific details are set forth in order to provide a thorough understanding of the present invention. It will be apparent, however to one skilled in the art that the present invention can be practiced without these specific details. In other instances, well-known structures and devices are shown in block diagram form to avoid obscuring the present invention.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMS, magneto-optical disks, read-only memories (ROMs), random access memories (RAMs), EPROMs, EEPROMs, magnetic or optical cards, or any type of media suitable for storing electronic instructions, and each coupled to a computer system bus. The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. Although all or some of the operations may be performed by software executing on one or more processing devices (e.g., CPUs) on a computer system or specialized apparatus, some or all of these operations may be performed by digital logic and/or circuitry, an integrated circuit (e.g., ASIC) or other semiconductor substrates. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1A:
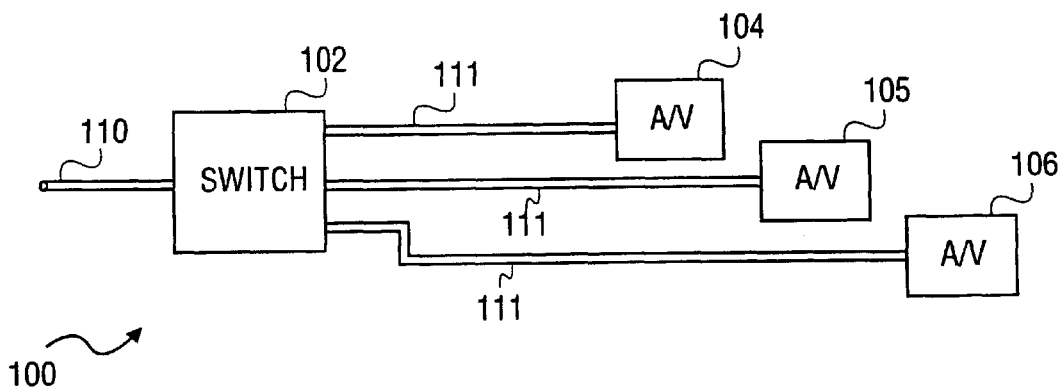
FIG. 1A is a block diagram illustrating a house reference distribution network 100 according to the prior art.

FIG. 1A is a block diagram illustrating a house reference distribution network 100 according to the prior art. House reference distribution network 100 includes switch 102 which connects house reference input line 110 to a variety of house reference distribution lines 111. In operation, switch 102 may function as a conventional switching device whereby an input line (e.g. house reference input line 110) is selectively coupled to one or more output lines (e.g. house reference distribution lines 111) based upon settings within switch 102. In other circumstances, switch 102 may be configured to function as a junction box or pass-thru, whereby signals carried on house reference input line 110 are contemporaneously coupled to all of house reference distribution lines 111.

In a representative configuration, house reference input line 110 delivers a house reference signal (also referred to as "video black") to switch 102 which, in turn passes the house reference signal to audio/video (A/V) devices 104–106 via house reference distribution lines 111. The house reference signal may be obtained from a variety of external sources, such as global positioning satellite systems for example, to be used within house reference distribution network 100, or may be generated by a clock generation circuit (not shown) contained within house reference distribution network 100.

Figure 1B:
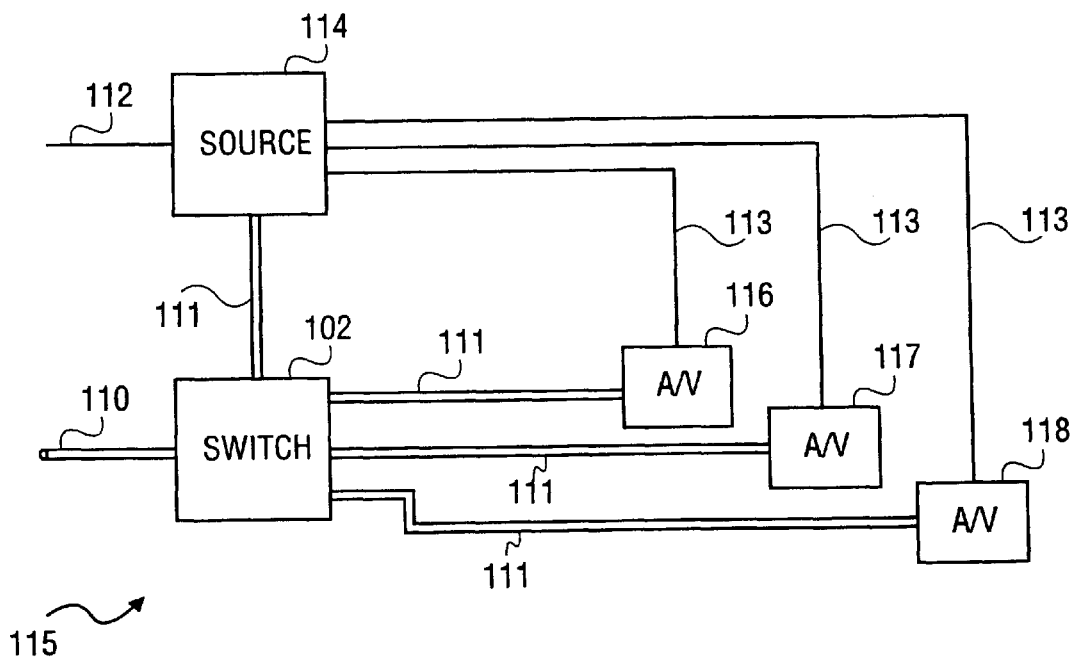
FIG. 1B is a block diagram illustrating a combined house reference distribution network and isochronous data transport network 115 according to the prior art.

FIG. 1B is a block diagram illustrating a combined house reference distribution network and isochronous data transport network 115 (hereinafter "network") according to the prior art. The house reference distribution portion of network 115 is substantially similar to the house reference distribution network 100 described above with respect to FIG. 1A. In addition to the house reference distribution portion, however, network 115 of FIG. 1B also includes an isochronous data transport portion. The isochronous ID data transport portion of network 115 includes input signal line(s) 112, and source 114; which are coupled to A/V devices 116–118 via isochronous data transfer lines 113. Isochronous data transfer lines 113 are representative of cabling configured to transmit isochronous data along with associated signaling information to A/V devices 116–118. In an exemplary arrangement, source 114 represents an audio/video device equipped to generate isochronous A/V data packets for transmission across isochronous data transfer lines 113. In other arrangements, source 114 may simply transmit isochronous A/V data packets received via signal line(s) 112.

For example, assume for the purpose of illustration that source 114 represents a digital video camera and A/V device 116 represents a digital storage device. Under such circumstances, source 114 would render video data based upon images detected by a charge-coupled device (CCD), and generate multiple data packets based upon the rendered video. Additionally, source 114 may be connected to a microphone that provides an audio input via signal line 112. The source 114 may utilize a house reference signal distributed across house reference distribution lines 111 to synchronize the received audio and rendered video for transmission as digital data packets across isochronous data transfer lines 113. Once generated, the data packets are transmitted to A/V device 116 where the data packets are stripped of their header information (parsed) and processed according to the functionality of A/V device 116. If A/V device 116 represents a display device, for example, the packetized data might be buffered, parsed and immediately displayed (i.e. streamed) on A/V device 116 as the data is received.

Based on the foregoing discussion, it should be apparent, therefore, that FIG. 1B illustrates an audio/video distribution network having at least two separate and substantially independent data distribution networks including a house reference distribution portion which functions to distribute a house reference signal to various A/V devices, and an isochronous data transport portion which functions to transmit isochronous audio and video data to the same devices.

Figure 2:
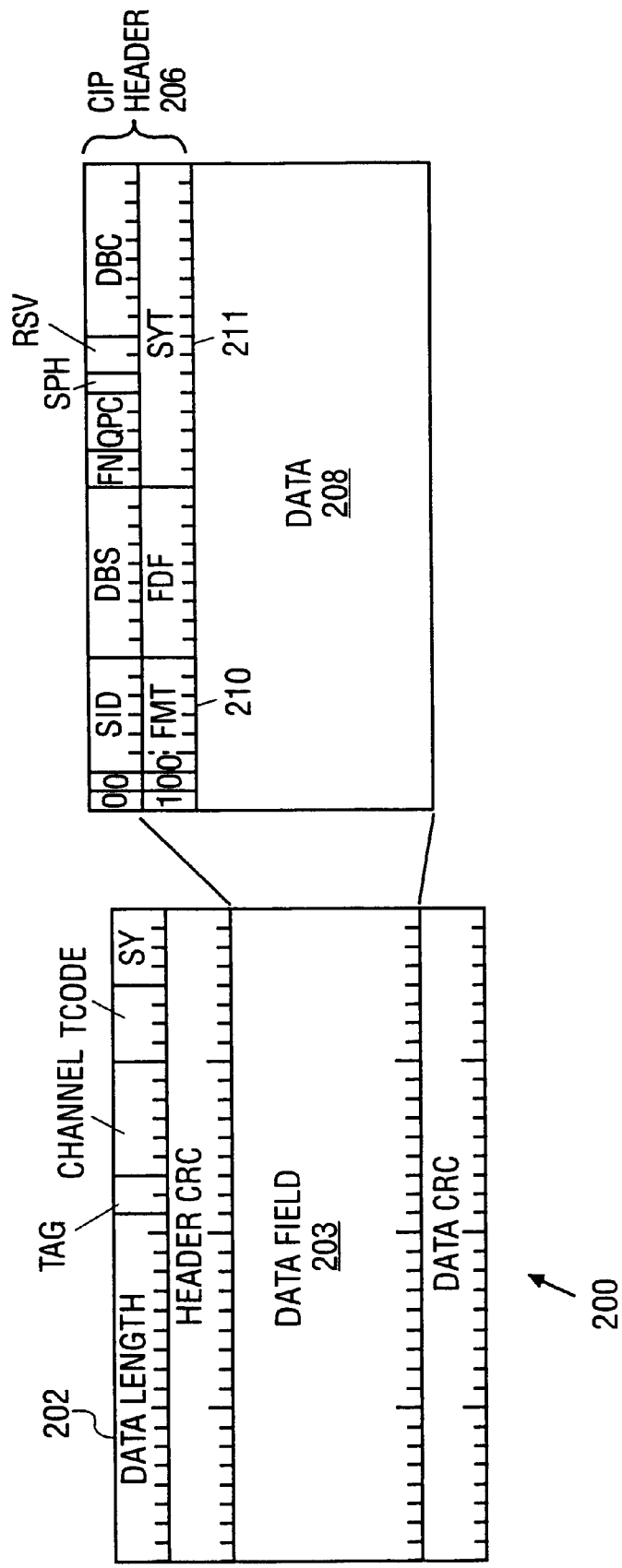
FIG. 2 illustrates a conventional isochronous network packet format according to IEEE 1394 and IEC 61883-1.

FIG. 2 illustrates an isochronous packet format specified by the IEEE 1394 and IEC 61883-1 standards. Among the various fields included within isochronous packet 200 is data length field 202. Data length field 202 specifies the length in bytes of the data field 203 contained within each isochronous packet. The length of data field 203 is determined through the combination of a Common Isochronous Packet (CIP) header 206 and data field 208. The CIP header 206 is placed at the beginning of the IEEE 1394 isochronous packet data field 203 and contains information regarding the type of real time data contained within data field 208. Among the various fields defined within CIP header 206 are format ID field (FMT) 210 and SYT field 211. FMT field 210, through the use of both pre-defined and user-definable code allocations, indicates the type of data (if any) contained within the isochronous packet. The most significant bit of FMT field 211 indicates whether a timestamp is to be included within the packet. SYT field 211 includes a binary representation of the actual timestamp depending upon the most significant bit of FMT field 211. For example, if the most significant bit of FMT field 211 is a "0", SYT field includes timestamp information.

Figure 3:
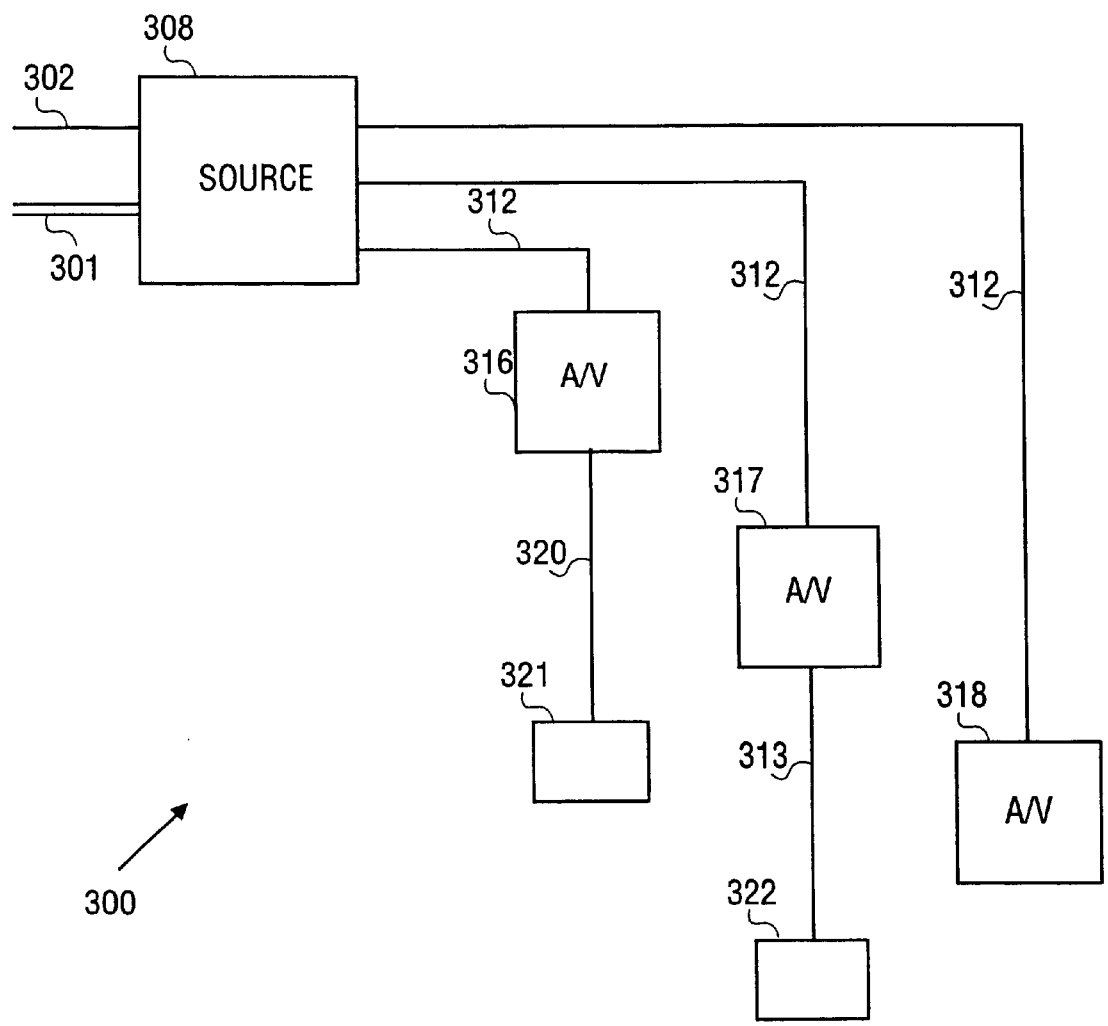
FIG. 3 is a block diagram illustrating an isochronous house reference distribution network according to one embodiment of the present invention.

FIG. 3 is a block diagram illustrating an isochronous house reference distribution network according to one embodiment of the present invention. Isochronous house reference distribution network 300 (hereinafter "isochronous reference network") includes source 303 and secondary A/V devices 316–318 communicatively coupled to each other via data bus 312. In one embodiment, data bus 312 represents an IEEE 1394 compliant data bus while source 303 represents a device possessing the attributes of a cycle master as defined by IEEE 1394. In an embodiment where source 303 represents a cycle master, source 303 generates a clock signal which may be utilized throughout isochronous reference network 300 as a house reference signal.

In another embodiment, source 303 receives a preexisting house reference signal on reference input line 301. As with a clock-generated reference signal, the received house reference signal may likewise be utilized throughout isochronous reference network 300 as a house reference signal. In yet another embodiment, source 303 contains circuitry such as a phase-locked loop for example, to lock a clock signal generated by source 303 to the received house reference signal for distribution in the form of isochronous network packets. In one embodiment, source 303 distributes the house reference signal by way of isochronous network packets based upon the IEEE 1394 and IEC 61883-1 standards.

In one embodiment of the present invention, isochronous reference network 300 is utilized in conjunction with isochronous network packets similar in form to isochronous packet 200, to distribute a house reference signal among multiple audio and video devices. By distributing the house reference signal over an isochronous network, the outmoded coaxial cabling typically used to distribute house reference signals may be eliminated thereby saving valuable space and the additional cost of the coaxial cabling. Furthermore, because audio and video data is resource intensive consuming large amounts of bandwidth during transmission, any opportunity to minimize bandwidth consumption should be welcomed.

In one embodiment of the present invention, a house reference signal is distributed among various audio and video devices using isochronous network packets that exclusively contain isochronous header information rather than header information accompanied by audio and/or video data. Because the data associated with a house reference signal typically represents an unused video black signal, such data may be discarded without detrimentally affecting to the reference signal. By discarding the unused data associated with the video reference signal, isochronous packet size may be reduced and overall bandwidth consumption decreased.

Assume for example, that source 303 of FIG. 3 receives a house reference signal containing video black data on reference input line 301, and source 303 receives digital video data over data input line 302. According to one embodiment of the present invention, source 303 phase locks an externally generated clock signal to the received video reference signal using techniques known in the art. Once the synchronization information is recovered from the house reference signal, the data portion (e.g. video black data) is discarded. Source 303 then generates a binary timestamp representing the phase locked reference signal and forms at least one isochronous network packet including the generated timestamp information. In practice, many such isochronous reference packets will be formed and transmitted across isochronous house reference distribution network 300. In one embodiment, source 303 continues to transmit the isochronous reference packets as long as the house reference signal continues to be received on reference input line 301. During transmission, source 303 may broadcast the isochronous reference packets across multiple isochronous channels, or source 303 may direct one or more particular packets to a specific one or more of A/V devices 316–318.

Each of A/V devices 316–318 may differently utilize the isochronous reference packets received from source 303. For example, A/V device 318 may receive the isochronous reference packets on data bus 312 and utilize the embedded house reference signal for synchronization with external video data such as that received by source 303 on video data input line 302. A/V device 317 may receive the isochronous reference packets on data bus 312 and essentially act as a repeater by forwarding the reference packets to remotely located device 322 on isochronous data bus 313. Lastly, A/V device 316 may receive the isochronous reference packets on data bus 312, only to convert the isochronous reference packets back into a house reference signal to be distributed on coaxial cable 320 to a remotely located device 321. It may be desirable to convert such a packetized reference signal back to a conventional house reference signal where legacy products and outdated cabling remain.

Figure 4:
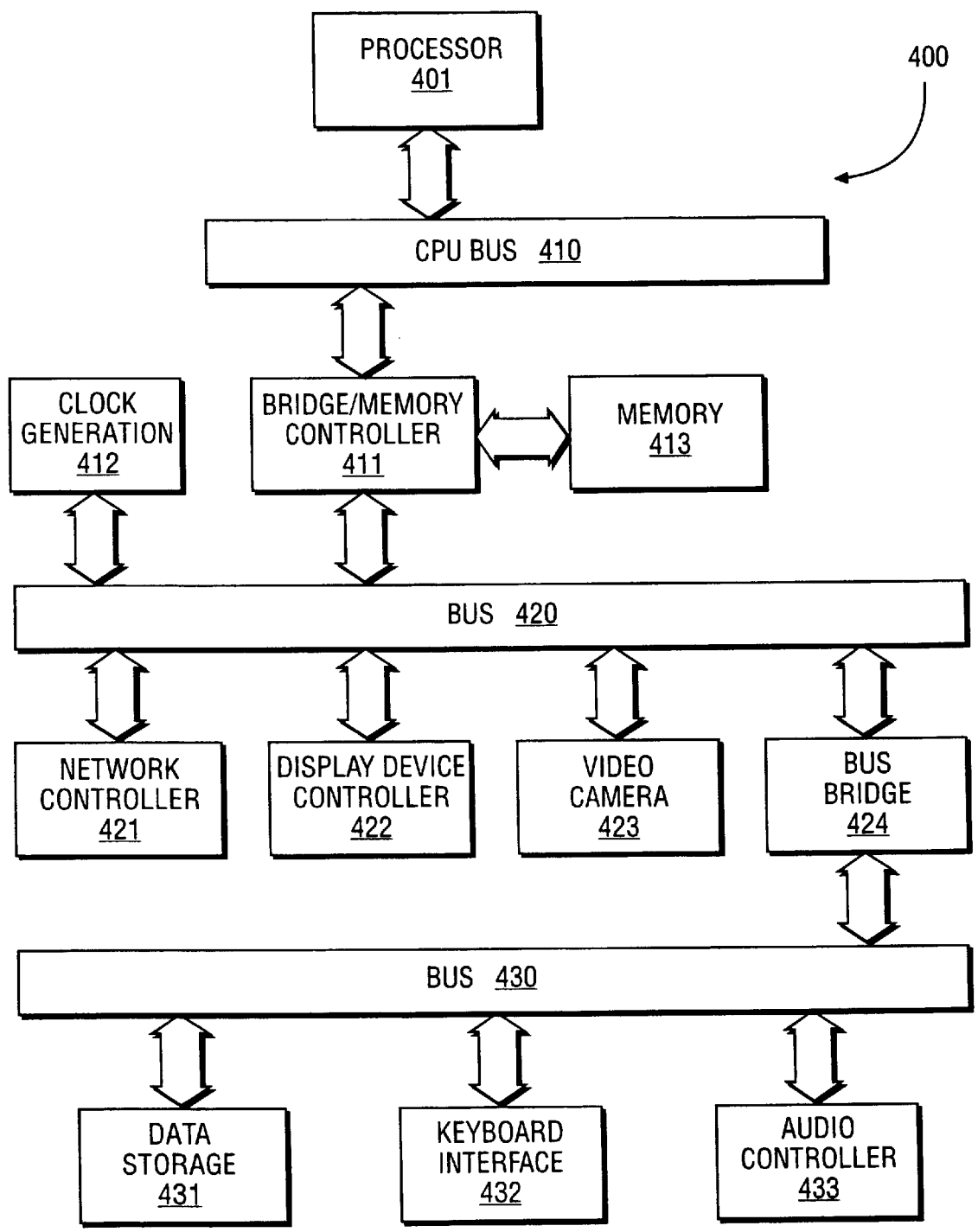
FIG. 4 is a block diagram illustrating a processing system upon which an embodiment of the present invention can be implemented.

FIG. 4 is a block diagram illustrating a processing system 400 upon which an embodiment of the present invention can be implemented. Processing system 400 may be contained within source 303 or any of A/V devices 316–318. Processing system 400 includes processor 401 that processes data signals. Processor 401 may be a complex instruction set computing (CISC) microprocessor, a reduced instruction set computing (RISC) microprocessor, a processor implementing a combination of instruction sets, or some other processing device known in the art. Although FIG. 4 illustrates an example a single processor system 400, it is understood that processor system 400 may be implemented with multiple processors. Processor 401 is coupled to a CPU bus 410 that transmits data signals between processor 401 and other components of system 400.

Processing system 400 also includes a memory 413, which may be a dynamic random access memory (DRAM) device, a synchronous direct random access memory (SDRAM) device, or any other memory device known in the art. In one embodiment, memory 413 stores instructions and code represented by data signals that, when executed by processor 401, cause processing system 400 to perform various functions described herein. Additionally, processing system 400 may optionally include a cache memory (not shown) coupled either directly or indirectly to processor 401.

A bridge/memory controller 411 is coupled to CPU bus 410 and memory 413. Bridge/memory controller 411 directs data signals between CPU bus 410 and a first I/O bus 420. First I/O bus 420 may represent a single bus or a combination of buses. For example, first I/O bus 420 may comprise an IEEE 1394 backplane, a Peripheral Component Interconnect (PCI) bus, a Personal Computer Memory Card International Association (PCMCIA) bus, or any other bus structure known in the art. Shown coupled to first I/O bus 420 are network controller 421, clock generation circuit 412, display device controller 422, and video camera 423.

Network controller 421 communicatively links processing system 400 to any number of external data networks such as for example, isochronous reference network 400. In one embodiment, network controller 421 includes circuitry to implement an IEEE 1394 compliant physical layer (PHY) providing isochronous signaling to isochronous reference network 300. In another embodiment network controller 421 provides internal isochronous signaling to processing system 400 via first I/O bus 420.

Clock generation circuit 412 represents at least one oscillator known in the art to generate a series of clock pulses. Clock generation circuit 412 is equipped to provide timing signals for all or some of the components of processing system 400 shown in FIG. 4. In one embodiment, clock generation circuit 412 generates a timing signal that is transmitted across one or more isochronous networks via network controller 421. In one embodiment, clock generation circuit 412 further includes circuitry, such as phase lock loop circuitry, to lock a generated timing signal to a received reference signal for distribution in the form of isochronous network packets via network controller 421. Although clock generation circuit 412 and network controller 421 are illustrated as being two separate devices, clock generation circuit 412 and network controller 421 may also be implemented as a single device having equivalent functionality.

Display device controller 422 is also coupled to first I/O bus 420. Display device controller 422 allows coupling of a display device (not shown) to processing system 400 and acts as an interface between the display device and processing system 400. The display device controller 422 may represent any of the various graphics adapter cards known in the art to display data on a display device.

A video camera 423 is also coupled to first I/O bus 420 to capture video into processing system 400. Video camera 423 may represent a conventional video camera having a lens and analog recording media or alternatively, video camera 423 may represent a digital video camera equipped with a charge-coupled device array to render digital video data to be stored in a digital memory device such as for example, memory 413.

A second I/O bus 430 may be included to provide communication links between various additional devices within processing system 400 including data storage device 431, keyboard interface 432, and audio controller 433. Data storage device 431 may represent a hard disk drive, a floppy disk drive, a CD-ROM device, a flash memory device or any other mass storage device known in the art. Keyboard interface 432 represents a user input interface such as a keyboard controller that is similarly coupled to second I/O bus 430. Audio controller 433 operates to coordinate the recording and rendering of audio in processing system 400. In one embodiment, audio controller 433 receives audio signals which are digitized and packetized by processor 401 and network controller 421 for transmission across an isochronous network.

Thus, a method of distributing video reference signals as isochronous network packets has been disclosed. In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method of distributing a reference signal comprising:
   receiving a source reference signal including source data;
   generating at a first device a first isochronous network packet based at least in part on the source reference signal and to the exclusion of the source data; and
   transmitting the first isochronous network packet to a secondary device to synchronize timing between the first device and the secondary device.

2. The method of claim 1, further comprising:
   receiving at the secondary device, the transmitted first isochronous network packet; and
   converting the received first isochronous network packet into a secondary reference signal for use by one or more additional devices in place of the source reference signal.

3. The method of claim 1, further comprising generating a second isochronous network packet based at least in part on the source reference signal and the source data.

4. The method of claim 1, wherein generating the first isochronous network packet comprises generating the first isochronous network packet based at least in part on a common isochronous packet (CIP) format.

5. The method of claim 4, wherein generating the first isochronous network packet comprises generating the first isochronous network packet based at least in part on IEEE 1394 isochronous packet format.

6. The method of claim 1, wherein the source reference signal is a video source reference signal.

7. The method of claim 1, wherein the first isochronous network packet is transmitted via an IEEE 1394 compliant transport medium.

8. An article of manufacture comprising a machine readable medium having a plurality of machine readable instructions stored thereon, wherein when executed by a processor, the instructions cause the processor to:
   receive a source reference signal including source data;
   generate at a first device a first isochronous network packet based at least in part on the source reference signal and to the exclusion of the source data; and
   transmit the first isochronous network packet to a secondary device to synchronize timing between the first device and the secondary device.

9. The article of manufacture of claim 8, comprising machine readable instructions that when executed, further cause the processor to:
   receive at the secondary device, the transmitted first isochronous network packet; and
   convert the received first isochronous network packet into a secondary reference signal for use in place of the source reference signal.

10. The article of manufacture of claim 8, comprising machine readable instructions that when executed, further cause the processor to generate a second isochronous network packet based at least in part on the source reference signal and the source data.

11. The article of manufacture of claim 8, wherein the machine readable instructions that cause the processor to generate the first isochronous network packet, further cause the processor to generate the first isochronous network packet based at least in part on a common isochronous packet (CIP) format.

12. The article of manufacture of claim 11, wherein the machine readable instructions that cause the processor to generate the first isochronous network packet, further cause the processor to generate the first isochronous network packet based at least in part on IEEE 1394 isochronous packet format.

13. The article of manufacture of claim 8, wherein the source reference signal is a video source reference signal.

14. The article of manufacture of claim 8, wherein the machine readable instructions that cause the processor to transmit the first isochronous network packet further cause the processor to transmit the first isochronous network packet via an IEEE 1394 compliant transport medium.

15. An apparatus comprising:
   means for receiving a source reference signal including source data;
   means for generating at a first device a first isochronous network packet based at least in part on the source reference signal and to the exclusion of the source data; and
   means for transmitting the first isochronous network packet to a secondary device to synchronize timing between the first device and the secondary device.

16. The apparatus of claim 15, further comprising means for generating a second isochronous network packet based at least in part on the source reference signal and the source data.

17. The apparatus of claim 15, wherein the means for generating the first isochronous network packet comprises means for generating the first isochronous network packet based at least in part on a common isochronous packet (CIP) format.

18. The apparatus of claim 17, wherein the means for generating the first isochronous network packet comprises means for generating the first isochronous network packet based at least in part on IEEE-1394 isochronous packet format.

19. The apparatus of claim 15, wherein the means for receiving the source reference signal includes means for receiving a video source reference signal.

20. The apparatus of claim 15, wherein the means for transmitting the first isochronous network packet includes means for transmitting the first isochronous network packet via a IEEE-1394 compliant transport medium.

21. A system comprising:
 a data communications port to receive a source reference signal including source data;
 circuitry to generate at a first device a first isochronous network packet based at least in part on the source reference signal and to the exclusion of the source data; and
 a network interface to transmit the first isochronous network packet to a secondary device to synchronize timing between the first device and the secondary device.

22. The system of claim 21, wherein the circuitry to generate the first isochronous network packet further comprises circuitry to generate a second isochronous network packet based at least in part on the source reference signal and the source data.

23. The system of claim 21, wherein the circuitry to generate the first isochronous network packet further comprises circuitry to generate the first isochronous network packet based at least in part on a common isochronous packet (CIP) format.

24. The system of claim 23, wherein the circuitry to generate the first isochronous network packet comprises circuitry to generate the first isochronous network packet based at least in part on an IEEE-1394 isochronous packet format.

25. The system of claim 21, wherein the network interface transmits the first isochronous network packet via an IEEE-1394 compliant transport medium.

* * * * *